Jan. 9, 1951  A. J. TIGGES  2,537,558
REMOVAL OF SOLIDS FROM GASES
Filed May 10, 1947  2 Sheets-Sheet 2
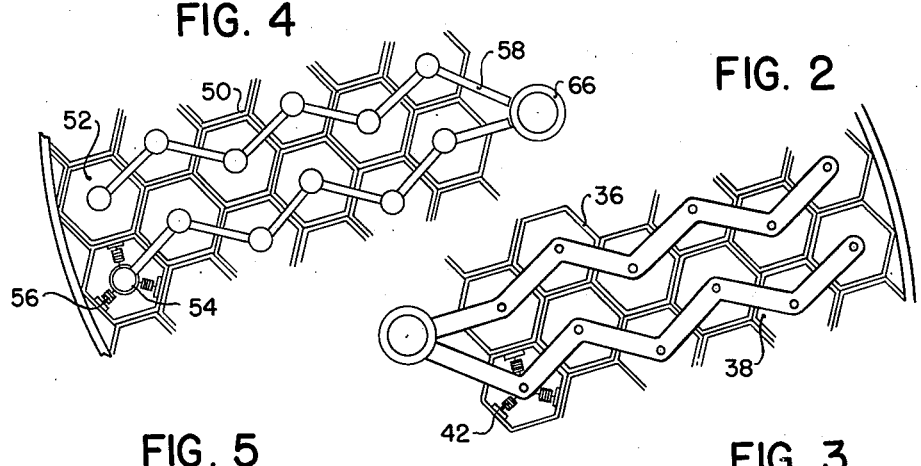
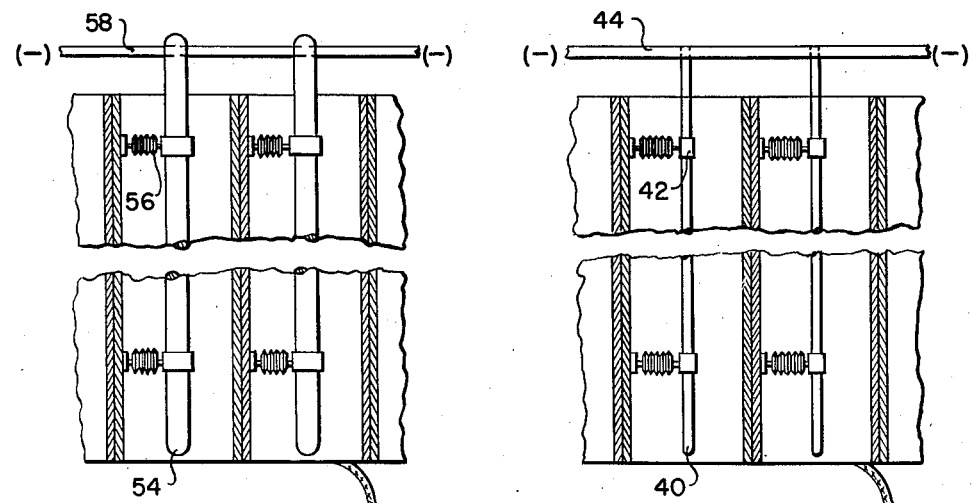
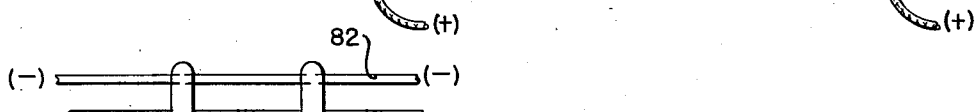
INVENTOR.
Alexander J. Tigges
BY
his Attorney Patented Jan. 9, 1951

2,537,558

UNITED STATES PATENT OFFICE 2,537,558

REMOVAL OF SOLIDS FROM GASES

Alexander J. Tigges, New York, N. Y., assignor to The Air Preheater Corporation, New York, N. Y.

Application May 10, 1947, Serial No. 747,166

5 Claims. (Cl. 183—114)

The present invention relates to the removal of solids from gases and in one of its aspects has reference to the removal of relatively very fine particles of matter, forming the constituents of smoke, from combustion gases. In another of its aspects the invention relates to the removal of both fine and coarse particles from such gases, and in still another of its aspects relates to method and means for removal of such particles from combustion gases from power boilers and the like, in which such gases are maintained in contact with heat absorbing surfaces until the gases are reduced to relatively low temperatures before being discharged to waste.

The characteristic smoke, cinders and ash carried by the combustion gases of power plant and other industrial forms of furnaces has long constituted a serious problem, and many different forms of apparatus have been used to abate this nuisance, such apparatus including chemical and electrical as well as mechanical devices for removing these solids. In the past, however, such devices when employed have been utilized in relatively low temperature zones, usually being applied to waste gases after all the heat usefully recoverable therefrom has been extracted. Quite efficient removal of the relatively coarse particles of for example, approximately 15 microns and greater in diameter, by known forms of apparatus has been accomplished, but the removal of the finer particles constituting what may be termed the smoke forming constituent of the solids has not heretofore been effectively or efficiently accomplished by methods and apparatus heretofore employed.

Also, in installations where combustion gases carrying particles having corrosive constituents pass in contact with heat absorbing surfaces, the methods and means heretofore employed for the removal of such particles have not been effective to eliminate or even satisfactorily reduce rapid corrosion of such surfaces, particularly at certain temperature zones. Corrosion under such circumstances has continued to occur at undesirably high rates even when special corrosion resisting materials, usually relatively expensive, have been used for the exposed surfaces.

Many expedients have been resorted to in order to reduce such corrosion to the minimum but no adequate remedy has heretofore been found. Even the more expensive corrosion resisting constructions involving the use of alloy metals and the like do not have a satisfactory length of life, and sectional construction, permitting the removal and replacement of corroded sections, has also proved to be unsatisfactory from a cost standpoint. In the one case high initial cost is involved without solving the problem, and in the other case relatively high initial cost and high maintenance costs are both involved.

The reason for the lack of better results appears to be due to the failure to understand the underlying causes and the nature of the factors causing such corrosion.

I have found that in contrast with the usual assumptions, corrosion is caused primarily, if not substantially entirely, by the very fine particles of solids, with the coarser and heavier particles having relatively much less corrosive effect. I have also found that the rate of corrosion bears a very definite functional relationship to the relative humidity of the gases and corresponding moisture content of the very fine particles carried thereby.

As will hereinafter be discussed more fully, the temperature and relative humidity conditions existing simultaneously in different portions of the same cross section of a gas pass may be substantially different, but in zones where the maximum relative humidity is quite low, corrosion of ordinary corrodible metal such as steel or iron is substantially limited even though the particles carried by the gases contain corrosive chemical constituents such as a high sulfur content or the like. When the relative humidity rises above a relatively low value and the particles contain corrosive constituents, corrosion sets in, and the higher the relative humidity the more rapid becomes the rate of corrosion.

I have further found that the reason for these phenomena is that the very fine particles forming a part of the products of combustion carried by the gases are usually formed of constituents having a greater affinity for and capacity to attract moisture than the larger and coarser particles. Depending upon the nature and combustion of the fuel used, the nature of the fine particles will vary but in general it may be said that they consist of fly ash or carbonaceous material or a combination of both. In a zone where the relative humidity of the gases increases to a substantial value these particles attract very considerable quantities of moisture. In fact I have found that some products of combustion of this nature under humid gas conditions attract moisture to such an extent that they become wet and gummy to the extent of being in semi-fluid or plastic condition, although for the purposes of this specification such particles are regarded and referred to as "solid," such term being employed to distinguish from gaseous matter and liquids, and not being limited in its meaning to hard or rigidly solid particles. On the other hand, the larger and coarser particles are of such nature that they, with perhaps in some instances the exception of only a negligible fraction of them, do not have the quality of adhering to surfaces with which they come in contact. Consequently, such particles will pass with the gases through a low temperature zone of comparatively high relative humidity, usually without absorbing more than a fraction of the moisture which will be absorbed under like conditions by the fine particles adhering to surfaces and remaining in the zone.

It is the general object of the present invention therefore to provide improved method and means for cleansing gases of fine particles and also of coarser particles if they are present, in a manner which will be effective to provide relatively clear gases for discharge to waste and which will also be effective to substantially eliminate corrosion of surfaces with which the gases come in contact before discharge and which with present methods and apparatus usually deteriorate rapidly if corrosive constituents are present in the products of combustion.

To accomplish this general object and other and more detailed objects which will hereinafter appear as this specification proceeds, the invention in its broader outline contemplates primarily the removal, to the extent practically possible, of the very fine particles less than approximately 15 microns in size and inclusive of the extremely fine particles of submicroscopic nature, which for convenience will hereinafter be referred to as "fines," in a temperature zone much higher than that previously employed as the location for removal apparatus and in which the relative humidity is very materially lower than in the zones where smoke removal apparatus has heretofore been used. The invention further contemplates, in installations where heat exchange surfaces are swept by gases at relatively low temperature, the installation of the apparatus for removing fines from the gases in the gas path ahead of such surfaces. In cases where the gases contain coarse particles in addition to fines, as in the case of gases from coal or other solid fuel fired furnaces, the coarse particles may also within the scope of certain aspects of the invention be removed at or adjacent to the zone where the fines are removed but preferably, for reasons hereinafter more fully explained, the coarse particles are removed subsequently to the removal of the fines and in a substantially lower temperature zone between which and the zone at which the fines are removed there may be interposed substantial areas of heat absorbing surface.

I have found that this method of removal, which is the opposite of the usual procedure, results in highly improved performance and substantial elimination of corrosion of heat absorbing surface even though coarse particles are permitted to pass through relatively low temperature heat exchange apparatus.

While the invention in its broader aspects is not limited to specific means for removal of solids, I have found that for the purpose of removing fines in a high temperature zone, electronic apparatus operating to ionize fines and including collector surface to which the fines are attached and adhere, and from which they may intermittently be removed, is advantageously employed. For gases carrying coarser particles as well as fines, any one of a number of known forms of apparatus for the removal of such particles may be employed, as for example a cyclone type of separator, and as previously pointed out such apparatus is advantageously located in a relatively low temperature zone. Among the reasons for this latter factor are that when employed in a low temperature zone the service conditions to which the material of the separator is subjected are much less severe than in a high temperature zone and cheaper metals can be used successfully. Also, the lower the temperature zone in which such apparatus is located the less is the volume of the gas to be cleansed, due to the contraction of the gas with drop in temperature.

The invention is applicable to a wide variety of installations individually having very different characteristics and requiring different treatment depending upon the nature of the fuel employed and the consequent nature of the products of combustion and also depending upon the extent to which heat is extracted from the gases before they are discharged to waste and the material of the heat exchange equipment employed to extract the heat.

One type of installation to which the invention is advantageously applicable is that of large power boilers, and by way of example but without limitation, the invention will hereinafter be described as applied to such an installation, illustrated in the accompanying more or less diagrammatic drawings in which:

Figs. 2 to 5 are fragmentary sections on enlarged scale, taken on the respectively numbered section lines of Fig. 1; and Fig. 6 is a fragmentary section showing a slightly different form of one part of the apparatus.

Figure 1:
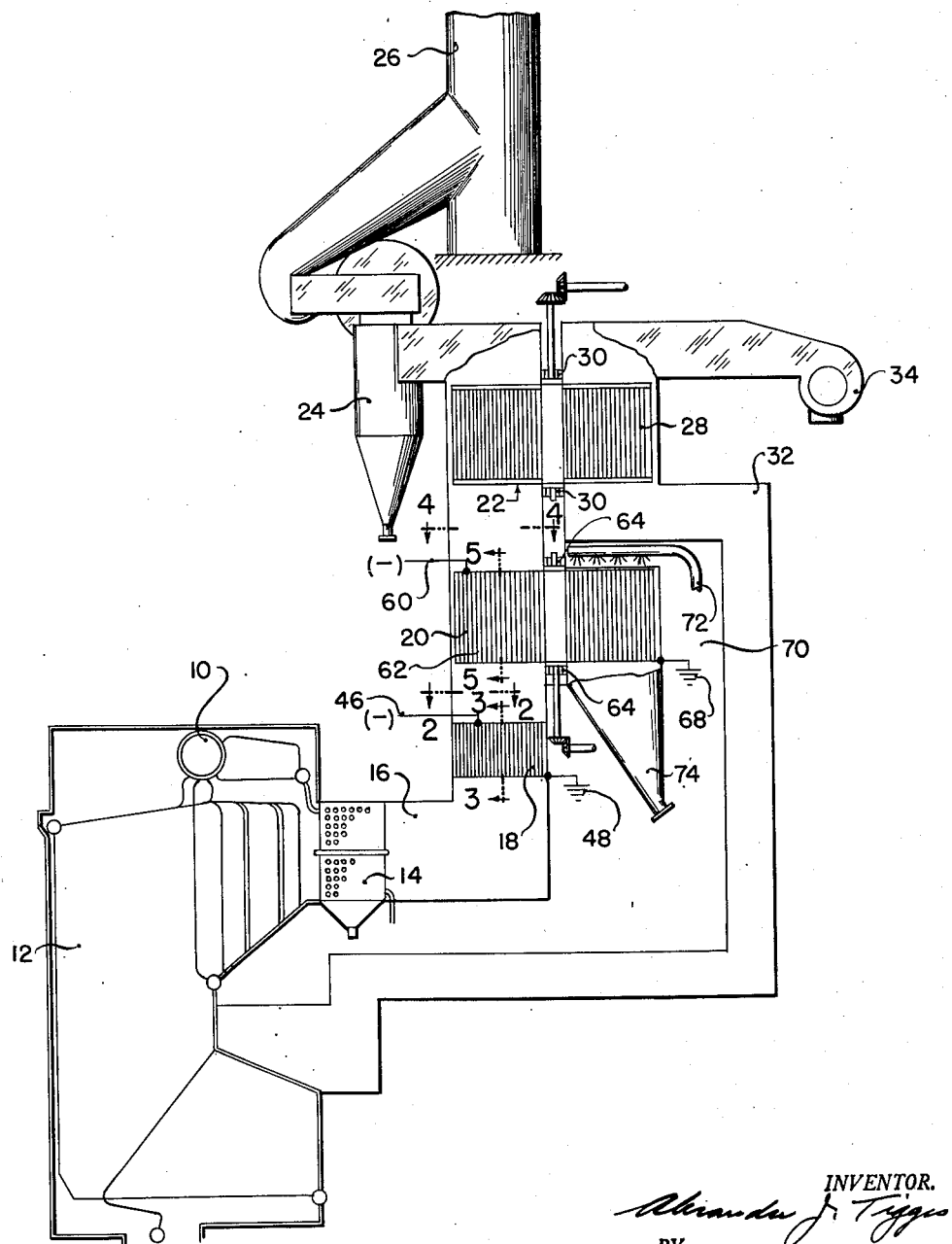
Fig. 1 is an elevation, partly in section, of a boiler plant embodying the invention.

Referring now more particularly to Fig. 1, the plant shown comprises a boiler 10, which may be of any desired kind and which in the example shown is provided with a large water walled furnace 12 suitable for the combustion of powdered coal as fuel. The products of combustion, after leaving the boiler, pass through a feedwater heater or economizer 14 to the breeching 16 and through the ionizing section 18 of the precipitating apparatus for removing the fines. After passing this section they pass through the collecting section 20 at which place the fines are removed. Thereafter, and with the fines removed, the products flow through an air preheater 22 and a separator 24 for removing the coarser solid particles before final discharge by a suitable exhaust fan to the stack 26.

In the plant shown the air preheater diagrammatically illustrated is of the well known Ljungstrom regenerative type, the principles of which are disclosed in U. S. Patent No. 1,652,025, granted December 6, 1927, on the application of Fredrik Ljungstrom. This type of heater is characterized by a rotor indicated at 28 and mounted in suitable bearings 30 for rotation by any desired driving mechanism so that the sections of the rotor pass in alternation through the gas duct forming a continuation of the breeching 16 and a duct 32 for combustion air through which the air is forced by fan 34 to the boiler furnace. The rotor is filled with a regenerative mass, ordinarily of metal plates forming a multiplicity of passages for flow of gas and air through the rotor. As this mass passes through the gas duct it is heated and the hot plates passing into the air duct give up their heat to the combustion air to preheat the latter before it reaches the furnace. Since this type of device is well known in the art it need not be described here in further detail for an understanding of the present invention.

The ionizing section of the precipitating apparatus for removing the fines is indicated more or less diagrammatically in Figs. 2 and 3 and in the example shown comprises a stationary metallic plate structure 36 providing a multiplicity of gas passages 38 extending longitudinally of the gas duct. Each of these passages has centrally located therein a longitudinally extending electrode 40 supported by suitable insulating supports 42, the several electrodes being connected at one end by suitable bus bars 44. A high electric potential is established between the plate structure and the electrodes, as is indicated diagrammatically in Fig. 1 by the terminal and ground connections 46 and 48.

The collecting section 20 of the precipitating apparatus is, in the example shown, separate from the ionizing section and comprises, as shown in Figs. 4 and 5, a metallic plate structure 50 similar to the structure 36 in the ionizing section and providing a large number of passages 52 for flow of the combustion products which have passed through the ionizing section. Each of the passages 52 is provided with a centrally located electrode 54 supported by suitable insulators 56 and connected at one end by bus bars 58. As shown in Fig. 1, plate structure 50 is mounted in a rotor 62 supported for turning movement in suitable bearings 64.

High electric potential is established between plate structure 50 and electrodes 54, this being indicated diagrammatically in Fig. 1 by the source of potential 60 and ground connection 68. For making the connection to the bus bars 58, a suitable slip ring connection indicated at 66 in Fig. 4 may be employed.

The rotor 62 is arranged so that it is only partially located in the gas duct or breeching 16, the portion of the rotor outside of this duct being located in a cleaning chamber 70 through which jets of cleaning fluid such as compressed air, steam or the like may be blown from suitable nozzles supplied through the pipe 72 indicated diagrammatically in Fig. 1. Chamber 70 communicates with a suitable collecting hopper shown at 74.

The operation of a typical plant of the general type above described is substantially as follows. Combustion of fuel in the furnace 12 results in the production of products of combustion at temperatures of the order of 2500°–3000° F., and these products, after passing over the heat absorbing surfaces of the boiler 10 and economizer 14, leave the latter at a temperature which ordinarily will range from between 550°–800° F. At such temperatures the relative humidity of the gases is extremely low and deposits of solids from these gases which may have accumulated on boiler and economizer surfaces are subject to temperature and humidity conditions which do not ordinarily involve risk of corrosion such as that likely to occur under conditions existing in zones of higher relative humidity and relatively lower temperature.

The relatively high temperature gases next pass through the ionizing section of the smoke eliminator or precipitator, where under the influence of the electrical potential of the apparatus the solid particles are highly charged or ionized.

The charged particles then pass to the collecting section where they are attracted to the collecting surfaces which are at different potential than the particles. When the particles impinge the collecting surfaces their charge is dissipated, but the fines, which it is the purpose of the apparatus to separate from the gases, adhere to the collecting surfaces. On the other hand, the coarser and heavier particles are either insufficiently attracted to the collecting surfaces to impinge them and are carried directly through the apparatus in the gas stream, or, if they do impinge, have insufficient adhesion after their charge is dissipated and also pass through with the gases.

While for purposes of illustration the apparatus has been indicated as having grounded plate structures and negatively charged electrodes in both ionizing and collecting sections, other polarities and combinations of polarities established by the use of alternating as well as constant potentials may be employed, so long as conditions are established for first imparting to the particles an ionizing charge and thereafter passing the charged particles in proximity to a collecting surface at different potential to which they are attracted. Potentials of the order of from 6000 to 15,000 or 20,000 volts have been found satisfactory, higher potentials usually being employed in the ionizing section than in the collecting section.

Adhesion of the fines to the collecting surfaces is impaired if a thick layer of solid deposit is allowed to accumulate and in the apparatus illustrated the deposits of fines on the collecting surfaces may be removed by turning the rotor 62, usually periodically, so that the coated portions of the rotor are brought into the cleaning duct 70 in which the collected material is removed by the cleaning jets, while clean sections of the rotor are moved into the gas duct for collection of further fines.

The gases, together with heavier and coarser particles (if such particles form a part of the products of combustion) then pass to the rotor of the air preheater in which the gas temperature is reduced to a value which will ordinarily be in the range of around 250°–400° F. These products then pass through the separator 24, which may be of the cyclone or other suitable type, for removing the coarser particles before the gases are finally discharged to the stack.

In addition to the production of the highly desirable result of a clear stack by removal of the fines, their removal at a relatively high temperature zone greatly reduces the hazard of fire or explosion in the lower temperature regions of the breeching, since such fines collect on the duct walls and heat exchange surfaces in such regions if not removed. This is particularly true in the case of gas or oil fired installations which are frequently productive of relatively large quantities of extremely fine particles of highly combustible carbonaceous soot.

Insofar as the factor of the prevention of corrosion is concerned, removal of the fines in a relatively high temperature zone is also requisite if the desired results are to be insured. While corrosion is functionally directly related to relative humidity and conditions of rapid corrosion are not ordinarily to be expected where the relative humidity is in excess of approximately 10–15%, it is ordinarily not desirable to place the precipitator in a zone where the maximum gas temperature corresponds to a relative humidity of as low as around 10% or slightly above. There is a definite relation between gas temperature and relative humidity in combustion gases produced from the ordinarily used solid, liquid and gaseous fuels, and with the commonly employed fuels such as coal, coke, fuel oil and either natural or artificial gas, relative humidity of around 10% will usually be found to correspond to gas temperatures of the order of 250°-300° F. However, for the purpose of obtaining the maximum benefit from the present invention it is not desirable to place the precipitating apparatus in zones of as low temperature as this. The reason for this is that in gas columns of the kind under consideration there is usually a substantial difference in temperature, and consequently in relative humidity, existing simultaneously in different parts of the same section of the gas pass. Temperatures are low at and adjacent to the boundary layers, and this is particularly true where the gases pass through tubular heat exchangers where laning of the gases frequently occurs. Also in the case of regenerative preheaters another factor is involved which tends to increase humidity in localized places. The regenerative mass entering the gas duct from the air duct is chilled and moreover may have picked up moisture from the air through which it has passed, which will in nearly all cases have a higher relative humidity than the heated gases.

All of the above factors operate to produce conditions in practical installations resulting in localized cold spots at lower temperatures and higher relative humidities than the maximum or even the average temperatures and these cold spots ordinarily exist at or immediately adjacent to the surfaces it is desired to protect from corrosion. Consequently to be effective from the corrosion standpoint the apparatus for removing the fines should be located in a zone of higher temperature than the temperature theoretically corresponding to a relative humidity of 10% or thereabouts. Practical experience has shown that to obtain the best desired results the precipitating apparatus should be located in a zone where the average gas temperature is a minimum of the order of 400° F., and in many instances such apparatus may advantageously be located in zones of much higher gas temperature. This is particularly true in cases where heat exchange surface is employed to which the gases have an entering temperature that may be substantially above 400° F. and a leaving temperature of around 400° F. or less. So far as the upper temperature limit is concerned, it has been found that leakage current, that is, loss by conduction through the gas between elements at different potential, increases in the high temperature range as the temperature increases. Consequently, from the standpoint of power consumption it is usually desirable to locate the apparatus in a zone in which the temperature does not exceed about 1000° F., although if desired for other reasons, location in zones of even higher temperature may be employed.

The principles of the invention, so far as the structure of a precipitating apparatus is concerned, may take many different specific forms. For example as illustrated in Fig. 6 the ionizing and collecting sections of the apparatus for removing fines may be combined in a single rotor. As indicated in this figure a continuous plate structure 74 corresponding to the plate structures 36 and 50 respectively of Figs. 2 and 4 has inserted in the end which the gases enter electrodes 76 connected by suitable bus bar connections 78, while in the exit ends there are located electrodes 80 for the collecting section suitably connected as indicated at 82 to another source of potential.

In such constructions the electrodes 76 and 80 are preferably connected to different sources of potential, since in an apparatus of this kind the electrodes in the ionizing section are ordinarily charged to a higher potential than the electrodes of the collecting section. In this form of apparatus the ionizing as well as the collecting sections may readily be subjected to cleaning by the same operation, which in some instances may be desirable.

Since the collecting section of the precipitating apparatus requires frequent cleaning and since heat exchange surfaces even when located behind the precipitating apparatus in the path of gas flow may also require cleaning to remove accumulations other than the previously removed fines, it may in some instances be advantageous to combine the two apparatus to facilitate cleaning. This may be particularly advantageous in instances where regenerative air preheaters of the Ljungstrom type are employed, in which case the smoke removing or precipitating apparatus may be incorporated in a part of the regenerative rotor to which gases flow at temperatures higher than that at which corrosion is to be expected due to the deposits of fines and before they reach the regenerative heat exchange part of the rotor.

While for purposes of illustrating the principles of the invention its application to a power boiler plant has been discussed and in connection therewith conventional temperature ranges obtained in different parts of the plant have been cited by way of example, it will be apparent that in its broader aspects the invention is applicable to fuel burning installations generally, such as industrial and metallurgical furnaces and the like and also to less elaborate boiler plants which may not make use of economizers, or air preheating or other heat exchange apparatus for extracting heat at relatively low temperature levels. In such installations, where there may not be heat exchange surfaces in relatively low temperature zones, the invention still provides the advantages not only of clean stack gases but also of reduction in fire hazard. Also depending upon the nature of the fuel burned, as for example gas or fuel oil, a separator for eliminating heavier and coarser particles than fines may not be required.

While ionizing apparatus of the kind hereinbefore described constitutes a preferred form of precipitator for fines, the invention in its broader aspects is not limited to this specific form of apparatus and other means effective to remove the fines may be employed. No claim is made herein to the specific construction of the eliminating apparatus for fines.

From the foregoing it will be evident that the invention is applicable in many different structural arrangements and combinations of apparatus employed in fuel burning installations, and the invention is accordingly to be understood as embracing all forms of construction and modes of operation falling within the purview of the appended claims.

What is claimed is:
1. The method of cleansing products of com- bustion including solids in particle form which includes the steps of ionizing the fines and causing the ionized fines to be precipitated upon collecting surface in a zone of sufficiently high temperature to maintain the gaseous products of combustion and entrained particles at a relative humidity at the collecting surface which does not exceed a value of the order of 10 to 15% as a maximum, and removing the fines from said collecting surface.

2. The method of removing products of combustion including solids in particle form comprising fines and relatively coarser particles which includes the steps of ionizing collecting and removing fines from the gaseous constituents of said products in a zone of sufficiently high temperature to maintain the gaseous products of combustion and entrained particles at a relative humidity at the collector which does not exceed a value of the order of 10 to 15% as a maximum, removing the fines from said collector, and thereafter separately removing the coarser particles from the gaseous constituents in a lower temperature zone of higher relative humidity.

3. The method of extracting heat from and cleansing products of combustion including solids in particle form comprising fines and relatively coarser particles which includes the steps of ionizing, collecting and removing fines from said products in a relatively high temperature zone while permitting coarser particles to pass through said zone with the gaseous constituents, thereafter passing the remaining constituents in heat exchange relation with heat absorbing surface to reduce the temperature of the gases to a point where fines carried thereby would become moistened due to the relatively high humidity.

4. In a plant wherein the absorption of heat from the products of combustion reduces their temperature to a point where they are of high relative humidity; a boiler including a fuel burning furnace for producing products of combustion; duct means for carrying said products from said boiler after they have passed over the boiler surface and partially cooled; precipitating means, including collecting surfaces, located in said duct means in a zone where the temperature is sufficiently high to maintain the gaseous products of combustion at the collecting surfaces of the precipitator at a relative humidity which does not exceed a value of the order of 10 to 15 per cent as a maximum so as to enable removal of fines from said products by said precipitator; and heat absorbing means located in said duct beyond the precipitator so as to be traversed by the remainder of said products passing through said precipitating means for reducing the temperature of the gaseous products of combustion to said point where fines carried thereby would become moistened due to such high relative humidity.

5. In a plant wherein the absorption of heat from the products of combustion reduces their temperature to a point where they are of high relative humidity; a boiler including a fuel burning furnace for producing products of combustion; duct means for carrying said products from said boiler after they have passed over the boiler surface and partially cooled; precipitating means, including collecting surfaces, located in said duct means in a zone where the temperature is sufficiently high to maintain the gaseous products of combustion at the collecting surfaces of the precipitator at a relative humidity which does not exceed a value of the order of 10 to 15 per cent as a maximum so as to enable removal of fines from said products by said precipitator; heat absorbing means located in said duct beyond the precipitator so as to be traversed by the remainder of said products passing through said precipitating means for reducing the temperature of the gaseous products of combustion to said point where fines carried thereby would become moistened due to such high relative humidity; and a collector for removing coarser particles from said products of combustion located in said duct means to be traversed by products of combustion discharged from said heat absorbing means.

ALEXANDER J. TIGGES.

REFERENCES CITED

The following references are of record in the file of this patent:

UNITED STATES PATENTS

| Number | Name | Date |
|---|---|---|
| 1,185,136 | Seaman | May 30, 1916 |
| 1,730,461 | Jacobus | Oct. 8, 1929 |
| 2,029,285 | Bennett | Feb. 4, 1936 |
| 2,215,807 | Derry | Sept. 24, 1940 |
| 2,382,253 | Penney | Aug. 14, 1945 |
| 2,422,564 | Pegg | June 17, 1947 |